US012611639B2

(12) United States Patent
Nunokawa

(10) Patent No.: US 12,611,639 B2
(45) Date of Patent: Apr. 28, 2026

(54) EXHAUST HYDROGEN DILUTION DEVICE

(71) Applicant: SUBARU CORPORATION, Tokyo (JP)

(72) Inventor: Takumi Nunokawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 843 days.

(21) Appl. No.: 17/686,207

(22) Filed: Mar. 3, 2022

(65) Prior Publication Data

US 2022/0297072 A1      Sep. 22, 2022

(30) Foreign Application Priority Data

Mar. 19, 2021    (JP) ................................. 2021-046452

(51) Int. Cl.
*B01F 25/40*          (2022.01)
*B01F 23/10*          (2022.01)
(Continued)

(52) U.S. Cl.
CPC .............. *B01F 25/40* (2022.01); *B01F 23/19* (2022.01); *B01F 35/7179* (2022.01);
(Continued)

(58) Field of Classification Search
CPC .......... B01F 25/40; B01F 23/10; B60L 50/72; Y02E 60/50
See application file for complete search history.

(56) References Cited

U.S. PATENT DOCUMENTS

| | | | |
|---|---|---|---|
| 5,755,107 A * | 5/1998 | Shirota ................ | B60H 1/3233 62/244 |
| 6,455,184 B1 * | 9/2002 | Peinecke ............. | H01M 4/8626 429/513 |

(Continued)

FOREIGN PATENT DOCUMENTS

| | | |
|---|---|---|
| JP | 2003-132915 A | 5/2003 |
| JP | 2006-031998 A | 2/2006 |

(Continued)

OTHER PUBLICATIONS

Japanese Office Action, dated Oct. 1, 2024 in Japanese Application No. 2021-046452 and English Translation Thereof.

*Primary Examiner* — Claire X Wang
*Assistant Examiner* — Patrick M Mccarty
(74) *Attorney, Agent, or Firm* — McGinn IP Law Group, PLLC

(57)          ABSTRACT

An exhaust hydrogen dilution device includes a purge receiving chamber to store hydrogen purged from a fuel cell of a fuel cell system and an air passage chamber adjoining the purge receiving chamber. Diluter gas flows through the air passage chamber. An interface member between the chambers comprises an interface member having first and second vents respectively on an upstream side and a down-stream side. A pressure loss at the first vent is greater than or equal to a pressure loss at the second vent. Some of the diluter gas flows into the purge receiving chamber through the first vent and is mixed with the hydrogen into a mixed gas that flows toward the second vent. The pressure losses are adjusted such that a ratio of the hydrogen flowing into the air passage chamber to a total amount of gases flowing through the air passage chamber is 4% or lower.

11 Claims, 7 Drawing Sheets

(51) Int. Cl.
  *B01F 35/71*    (2022.01)
  *B60L 50/72*    (2019.01)
  *H01M 8/0662*   (2016.01)
  *B01F 25/00*    (2022.01)

(52) U.S. Cl.
  CPC ........... *B60L 50/72* (2019.02); *H01M 8/0662*
    (2013.01); *B01F 2025/916* (2022.01)

(56)     References Cited

U.S. PATENT DOCUMENTS

| | | | | |
|---|---|---|---|---|
| 11,231,203 | B1 * | 1/2022 | Des Champs | ............ F16T 1/20 |
| 11,788,767 | B2 * | 10/2023 | Gorman | ................ F24F 13/224 |
| | | | | 62/289 |
| 2003/0077488 | A1 | 4/2003 | Yamamoto et al. | |
| 2006/0040158 | A1 * | 2/2006 | Numata | .................. F01N 3/005 |
| | | | | 429/513 |
| 2006/0053818 | A1 * | 3/2006 | Yoshida | ................ F28F 17/005 |
| | | | | 62/272 |
| 2007/0015031 | A1 * | 1/2007 | Numata | ........... H01M 8/04089 |
| | | | | 429/513 |

| | | | | |
|---|---|---|---|---|
| 2007/0166485 | A1 | 7/2007 | Matsumoto et al. | |
| 2010/0092812 | A1 * | 4/2010 | Ishiguro | .............. H01M 8/0662 |
| | | | | 429/425 |
| 2010/0167150 | A1 * | 7/2010 | Usami | .............. H01M 8/04089 |
| | | | | 429/513 |
| 2013/0295474 | A1 * | 11/2013 | Yoshida | .................. B60L 58/30 |
| | | | | 429/414 |
| 2015/0171458 | A1 * | 6/2015 | Miyamoto | .......... H01M 8/0271 |
| | | | | 429/535 |
| 2016/0001637 | A1 * | 1/2016 | Kume | .................. B60H 1/3233 |
| | | | | 62/285 |
| 2016/0240870 | A1 * | 8/2016 | Kim | ........................ B01D 71/68 |
| 2019/0366805 | A1 * | 12/2019 | Kominami | ............ F28F 9/0243 |
| 2020/0067111 | A1 * | 2/2020 | Horiuchi | .......... H01M 8/04014 |
| 2020/0144655 | A1 * | 5/2020 | Takeyama | ......... H01M 8/04089 |

FOREIGN PATENT DOCUMENTS

| | | | |
|---|---|---|---|
| JP | 2006-244799 | A | 9/2006 |
| JP | 2006-343107 | A | 12/2006 |
| JP | 2007-193993 | A | 8/2007 |
| JP | 2009-123578 | A | 6/2009 |

* cited by examiner

EXHAUST HYDROGEN DILUTION DEVICE

CROSS-REFERENCE TO RELATED APPLICATIONS

The present application claims priority from Japanese Patent Application No. 2021-046452 filed on Mar. 19, 2021, the entire contents of which are hereby incorporated by reference.

BACKGROUND

The disclosure relates to an exhaust hydrogen dilution device intended for a fuel cell system applicable to a vehicle and the like.

Fuel cells included in fuel cell vehicles generate electric energy, for driving the vehicles for example, through an electrochemical reaction between hydrogen supplied to the anode and oxygen supplied to the cathode.

In such a fuel cell, the concentration of hydrogen at the anode is reduced by the above electrochemical reaction and other factors. Therefore, the resultant gas containing hydrogen is to be purged by opening a purge valve with a predetermined timing (hereinafter, the gas thus purged is also referred to as "purged hydrogen"). In view of the above, dilution devices have been disclosed by, for example, Japanese Unexamined Patent Application Publication (JP-A) No. 2007-193993, JP-A No. 2006-031998, and JP-A No. 2003-132915, in each of which gas to be exhausted from the vehicle is diluted such that the amount of hydrogen in the exhaust gas is reduced to a predetermined ratio (4% or lower, for example).

SUMMARY

An aspect of the disclosure provides an exhaust hydrogen dilution device to be mounted on a fuel cell system. The exhaust hydrogen dilution device includes a purge receiving chamber and an air passage chamber. The purge receiving chamber is configured to temporarily store hydrogen that is to be purged intermittently from a fuel cell of the fuel cell system. Diluter gas flows through the air passage chamber. The air passage chamber adjoins the purge receiving chamber. An interface region between the purge receiving chamber and the air passage chamber comprises an interface member having a first vent on an upstream side and a second vent on a downstream side. A pressure loss at the first vent is greater than or equal to a pressure loss at the second vent. Some of the diluter gas flows from the air passage chamber into the purge receiving chamber through the first vent and is mixed with the hydrogen stored in the purge receiving chamber into a mixed gas that flows toward the second vent. The pressure loss at the first vent and the pressure loss at the second vent are adjusted such that a ratio of the hydrogen flowing into the air passage chamber through the second vent is 4% or lower with respect to a total amount of gases that flow through the air passage chamber. The mixed gas in the purge receiving chamber flows into the air passage chamber through the second vent and is diluted with the diluter gas.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
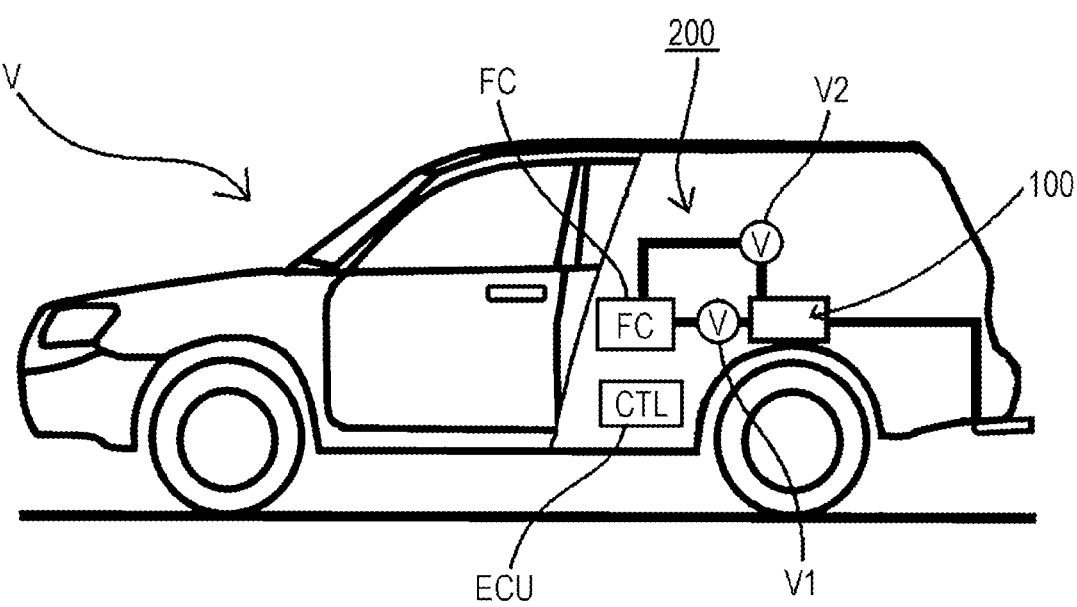
FIG. 1 schematically illustrates a fuel cell vehicle including a fuel cell system according to an embodiment.

Currently known technologies including those cited above are not considered to satisfactorily meet the market demands and have difficulties in solving the following problems.

The dilution device disclosed by JP-A No. 2007-193993, for example, is based on a technique of diluting hydrogen in a space 43, into which purged hydrogen is supplied. To achieve the above predetermined ratio with such a dilution device, a satisfactory amount of diluter gas (air) is to be supplied into the space 43. Consequently, the volume of the dilution device increases. The dilution device disclosed by JP-A No. 2006-031998 is also based on the technique of diluting hydrogen in a dilution container 51, into which purged hydrogen is supplied. Consequently, the volume of the dilution device increases, as with the case of the dilution device disclosed by JP-A No. 2007-193993.

In the dilution device disclosed by JP-A No. 2003-132915, hydrogen is diluted in a space (a dilution space 10) different from the space (a storage area 9) into which purged hydrogen is supplied. However, the configuration of a vent portion 14 disclosed by JP-A No. 2003-132915 limits the method of hydrogen dilution to hydrogen transfer caused by diffusion and pressure difference. In the method of diluting purged hydrogen disclosed by JP-A No. 2003-132915, hydrogen dilution may be insufficient under some operating conditions (for example, when the power generated by the fuel cell is low), failing in achieving the target dilution ratio.

It is desirable to provide an exhaust hydrogen dilution device capable of achieving appropriate treatment of purged hydrogen, regardless of the operating conditions of vehicles.

Embodiments of the disclosure will now be described. Details except those to be described below may be complemented by any technologies and configurations on which known fuel cell systems, fuel cell vehicles, and exhaust hydrogen dilution devices including those cited above are based. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A. First Embodiment: Fuel Cell System 200

A configuration of a fuel cell system 200 according to a first embodiment of the disclosure will first be described with reference to FIGS. 1 and 2. The fuel cell system 200 according to the first embodiment is included in, for example, a known fuel cell vehicle V. The following description relates to a case where the fuel cell system 200 is applied to an automobile. The application of the disclosure is not limited to automobiles and maybe, for example, stationary fuel cell systems intended for household facilities and the like, and mobile fuel cell systems intended for aircrafts and the like.

The fuel cell system 200 included in the fuel cell vehicle V includes an electronic control unit ECU, a fuel cell FC, an exhaust hydrogen dilution device 100, an adjusting valve V1, an adjusting valve V2, gas passages, and so forth. The electronic control unit ECU controls relevant elements of the vehicle V, including the operation of the fuel cell FC. The exhaust hydrogen dilution device 100 dilutes hydrogen that is purged intermittently from the fuel cell FC (the hydrogen thus purged is hereinafter referred to as "purged hydrogen Hp"). The adjusting valve V1 adjusts the flow rate of the purged hydrogen Hp. The adjusting valve V2 adjusts the flow rate of diluter gas DA, which will be described separately below. Relevant gases, including the gas discharged from the fuel cell FC, are supplied to the exhaust hydrogen dilution device 100 through the gas passages.

The electronic control unit ECU includes, for example, a processor such as a central processing unit (CPU) or a microprocessing unit (MPU), an electric circuit, and storages such as a random-access memory (RAM) and a read-only memory (ROM). Some or all elements of the electronic control unit ECU may be firmware or the like that is updatable, or may be program modules or the like to be executed in accordance with commands issued by the CPU or the like.

Passage Configuration in Fuel Cell System 200

An example configuration of the gas passages in the fuel cell system 200 will now be described.

Figure 2:
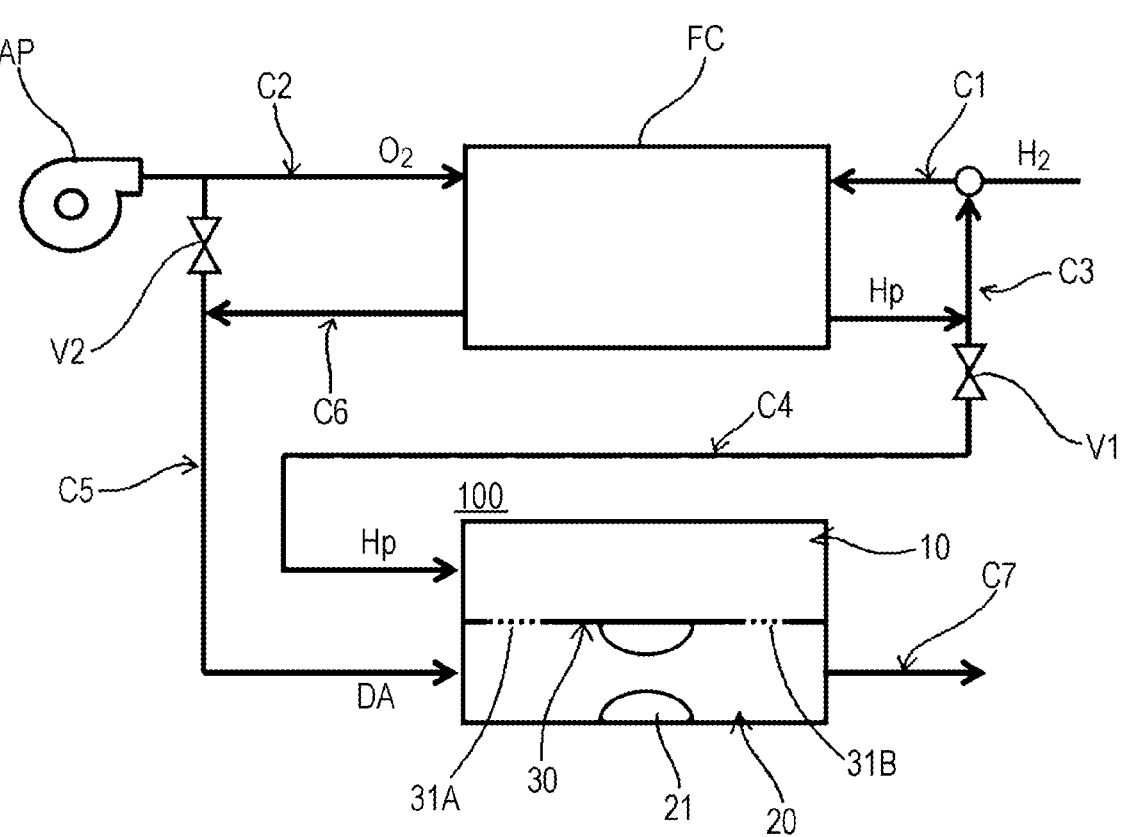
FIG. 2 schematically illustrates the fuel cell system according to the embodiment.

Referring to FIG. 2, the fuel cell system 200 according to the first embodiment, includes a hydrogen supply passage C1, which is coupled to the fuel cell FC and to a known hydrogen tank (not illustrated) and through which hydrogen is supplied to the fuel cell FC. The fuel cell system 200 further includes an air supply passage C2, which is coupled to, for example, an air compressor AP and through which oxygen (air) is supplied to the fuel cell FC.

The fuel cell system 200 further includes a hydrogen circulation passage C3, which is coupled to the hydrogen supply passage C1 and through which the purged hydrogen Hp received from the fuel cell FC is mixed, according to need, with the hydrogen to be supplied to the fuel cell FC. The fuel cell system 200 further includes a hydrogen purge passage C4, which branches from the hydrogen circulation passage C3 and through which the purged hydrogen Hp is supplied into the exhaust hydrogen dilution device 100 to be described below.

The fuel cell system 200 further includes a diluter gas supply passage C5, which is coupled to the air compressor AP and through which air is supplied to the exhaust hydrogen dilution device 100 to be described in detail separately below. The fuel cell system 200 further includes an air discharge passage C6, which couples the fuel cell FC and the diluter gas supply passage C5 to each other and through which air discharged from the fuel cell FC flows into the diluter gas supply passage C5. The fuel cell system 200 further includes an exhaust passage C7, which is coupled to an air passage chamber 20, which is included in the exhaust hydrogen dilution device 100. The purged hydrogen Hp is diluted before being exhausted from the air passage chamber 20 to the outside of the vehicle V.

In the first embodiment, for example, if the flow rate of the air discharged from the fuel cell FC is insufficient as the diluter gas DA, air from the air compressor AP may be supplied supplementarily into the diluter gas supply passage C5.

The structure of the passages described above is not limited as long as the above functions are obtained. The passages may be formed of known pipes.

The adjusting valve V1 that adjusts the flow rate of the purged hydrogen Hp may be a known valve mechanism such as an electromagnetic valve and may be provided to the hydrogen purge passage C4. The electronic control unit ECU according to the first embodiment controls, for example, the adjusting valve V1 to be opened or closed, so that the purged hydrogen Hp flows into a purge receiving chamber 10, which is included in the exhaust hydrogen dilution device 100, through the hydrogen purge passage C4.

The adjusting valve V2 that adjusts the amount of the diluter gas DA to be supplied may be a known valve mechanism such as an electromagnetic valve and may be provided to the diluter gas supply passage C5. The electronic control unit ECU according to the first embodiment controls, for example, the adjusting valve V2 to be opened or closed, so that air (the diluter gas DA) is supplied from at least one of the air compressor AP or the fuel cell FC into the air passage chamber 20 of the exhaust hydrogen dilution device 100 through the diluter gas supply passage C5.

Exhaust Hydrogen Dilution Device 100

A configuration of the exhaust hydrogen dilution device 100 according to the first embodiment will now be described with reference to FIGS. 3 to 6 as well.

The exhaust hydrogen dilution device 100 according to the first embodiment forms a part of the above fuel cell system 200. The exhaust hydrogen dilution device 100 has, for example, a cubic housing, the inside of which is sectioned into the purge receiving chamber 10 and the air passage chamber 20.

The material for the housing of the exhaust hydrogen dilution device 100 is not limited and may be a known metal material such as aluminum or steel, or a known resin material such as plastic. The shape of the housing of the exhaust hydrogen dilution device 100 is not limited to a cuboid and may be any other known shape that corresponds to relevant factors of the vehicle V, such as body structure, model, and so forth.

The purge receiving chamber 10 is the upper one of the two chambers in the housing of the exhaust hydrogen dilution device 100. The purge receiving chamber 10 temporarily stores the hydrogen that is purged intermittently from the fuel cell FC, i.e., the purged hydrogen Hp.

The air passage chamber 20 is the lower one of the two chambers in the housing of the exhaust hydrogen dilution device 100. A region of the air passage chamber 20 that is directly below and on the downstream side with respect to a second vent 31B, to be described below, serves as a space in which hydrogen contained in mixed gas Hd, to be described below, is diluted with the diluter gas DA. As is understood from FIG. 3 and others, the purge receiving chamber 10 and the air passage chamber 20 are separated from each other in the housing by an interface member 30.

The interface member 30 is provided between the purge receiving chamber 10 and the air passage chamber 20. The interface member 30 according to the first embodiment serves as the bottom plate of the purge receiving chamber 10 and as the top plate of the air passage chamber 20. The purge receiving chamber 10 and the air passage chamber 20 may be provided separately from each other, forming respective cubic bodies, with the bottom plate of one of the two being bonded to the top plate of the other, whereby the exhaust hydrogen dilution device 100 may be obtained. Alternatively, the purge receiving chamber 10 and the air passage chamber 20 may be molded together as a single component.

Figure 3:
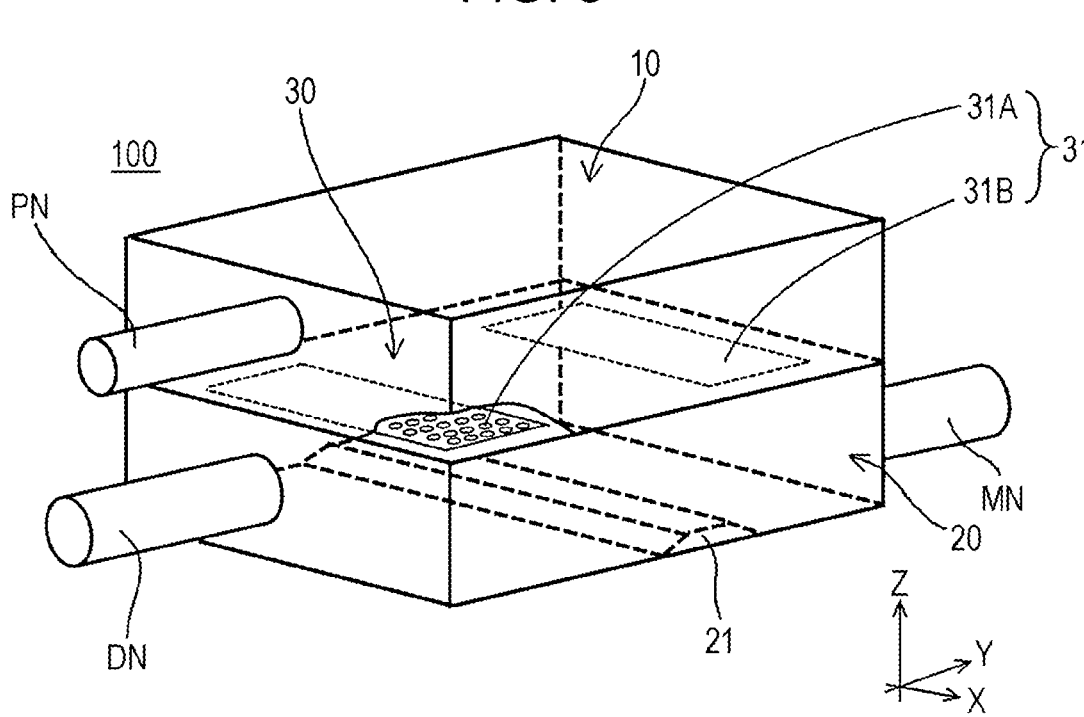
FIG. 3 schematically illustrates an exhaust hydrogen dilution device according to the embodiment.

As is understood from FIGS. 2 and 3, the interface member 30 according to the first embodiment has vents 31 (a first vent 31A and the second vent 31B), through which the purge receiving chamber 10 and the air passage chamber 20 communicate with each other in such a manner as to allow gas to flow from one of the two to the other. The vents 31 each include, for example, a plurality of through-holes designed with a predetermined diameter and a predetermined opening ratio. The number and shape of the plurality of through-holes provided as the vents 31 in the first embodiment are not limited as long as pressure loss, to be described below, is adjustable. If the purge receiving chamber 10 and the air passage chamber 20 are separate bodies, each of the two may be formed as a pipe that is designed to have adjusted pressure loss. Furthermore, the pipe may be filled with a known flocculent filler.

The interface member 30 of the exhaust hydrogen dilution device 100 according to the first embodiment has the first vent 31A on the upstream side (the −Y side in FIG. 3) and the second vent 31B on the downstream side (the +Y side in FIG. 3).

The hydrogen purge passage C4 and the purge receiving chamber 10 are coupled to each other with a purge nozzle PN. At least a part, including the distal end, of the purge nozzle PN resides in the purge receiving chamber 10. Thus, the purged hydrogen Hp flowing through the hydrogen purge passage C4 is discharged from the distal end of the purge nozzle PN into the purge receiving chamber 10.

Figure 5A:
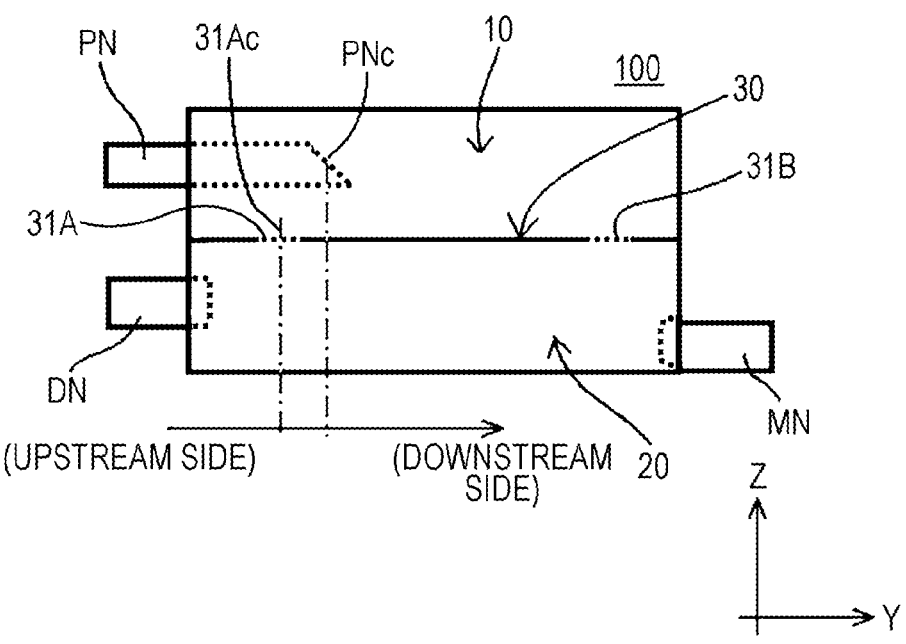
FIG. 5A schematically illustrates a positional relationship between a first vent and a purge nozzle in the exhaust hydrogen dilution device.
Figure 5B:
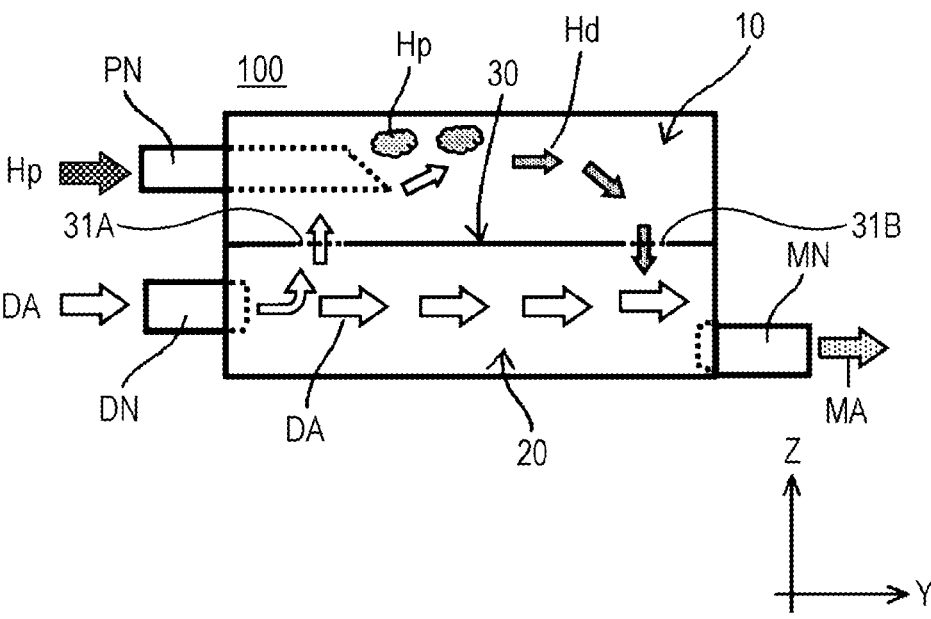
FIG. 5B schematically illustrates how dilution is achieved with the positional relationship illustrated in FIG. 5A.

In some embodiments, as illustrated in FIG. 5A, the distal end (defined with reference to a center PNc of the opening, for example) of the purge nozzle PN from which the purged hydrogen Hp is discharged into the purge receiving chamber 10 is positioned on the downstream side with respect to the first vent 31A (defined with reference to a center 31Ac, for example). Therefore, as illustrated in FIG. 5B, the purged hydrogen Hp discharged into the purge receiving chamber 10 is likely to flow along with the below-described diluter gas DA, which flows from the first vent 31A toward the second vent 31B. Thus, for example, the probability of unintentional backflow of the purged hydrogen Hp toward the first vent 31A in the purge receiving chamber 10 is reduced.

The diluter gas supply passage C5 and the air passage chamber 20 are coupled to each other with a dilution nozzle DN. At least a part, including the distal end, of the dilution nozzle DN resides in the air passage chamber 20. Thus, the diluter gas DA (air, for example) flowing through the diluter gas supply passage C5 is discharged from the distal end of the dilution nozzle DN into the air passage chamber 20. The air passage chamber 20 is provided with an exhaust nozzle MN on the side (downstream side) opposite the dilution nozzle DN. Final gas MA with a hydrogen ratio within an appropriate range (for example, 4% or lower for easy handling), which will be described separately below, is exhausted from the exhaust hydrogen dilution device 100 through the exhaust nozzle MN.

Pressure Loss Adjustment at First Vent 31A and Second Vent 31B

Figure 4:
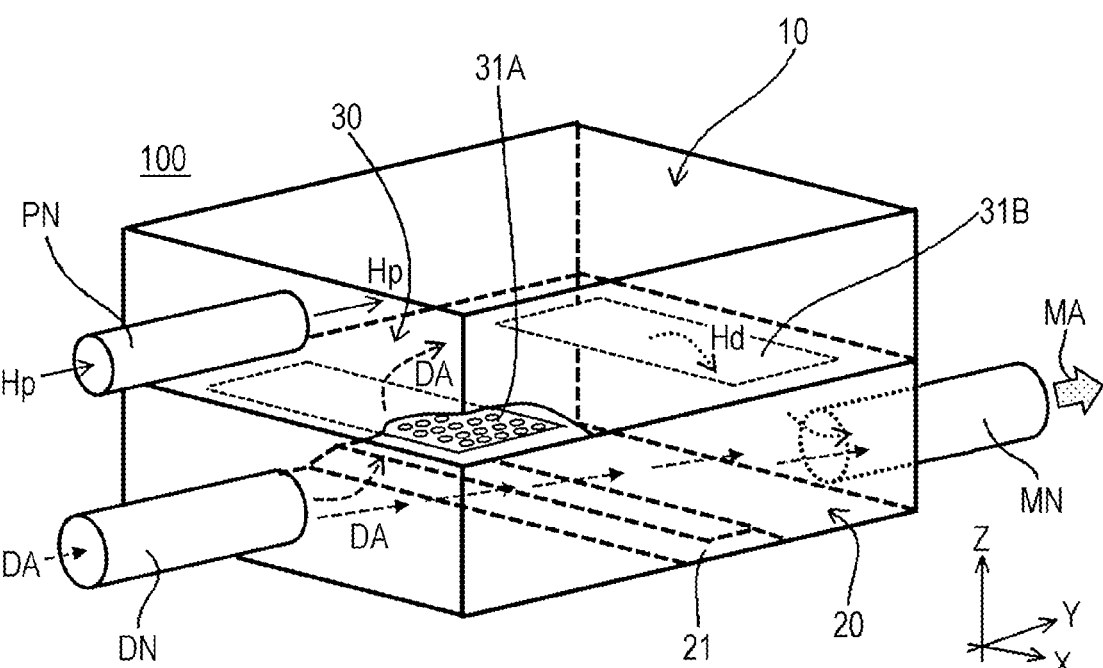
FIG. 4 schematically illustrates how purged hydrogen and diluter gas flow in the exhaust hydrogen dilution device (as an example case)

FIGS. 4 and 5B illustrate how the diluter gas DA and the purged hydrogen Hp flow in the first embodiment.

As described above, the diluter gas DA is supplied into the air passage chamber 20 through the dilution nozzle DN. At least some of the diluter gas DA thus supplied into the air passage chamber 20 serves as second gas that flows through the first vent 31A into the purge receiving chamber 10, whereas the remainder of the diluter gas DA serves as first gas that flows toward the downstream side (toward the exhaust nozzle MN) of the air passage chamber 20.

Meanwhile, the purged hydrogen Hp discharged into the purge receiving chamber 10 flows toward the downstream side in such a manner as to be guided by the second gas (the diluter gas DA) having flowed from the air passage chamber 20 through the first vent 31A into the purge receiving chamber 10. Thus, the purged hydrogen Hp discharged into the purge receiving chamber 10 and the diluter gas DA are mixed together into mixed gas Hd, which flows toward the second vent 31B.

The mixed gas Hd obtained from the diluter gas DA and the purged hydrogen Hp then flows through the second vent 31B, provided on the downstream side of the purge receiving chamber 10, into the air passage chamber 20. The mixed gas Hd having flowed through the second vent 31B into the air passage chamber 20 is further mixed with the first gas (the diluter gas DA) flowing from the upstream side of the air passage chamber 20. Thus, the hydrogen contained in the mixed gas Hd is further mixed with and thus diluted with the first gas (the diluter gas DA). The mixture of the mixed gas Hd and the first gas (the diluter gas DA) is then exhausted as the final gas MA from the exhaust hydrogen dilution device 100 to the outside through the exhaust nozzle MN.

In the first embodiment, as to be described below, pressure loss is adjusted such that the ratio of hydrogen flowing into the air passage chamber 20 through the second vent 31B (i.e., the ratio of hydrogen contained in the mixed gas Hd) is 4% or lower with respect to the total amount of gases that flow through the air passage chamber 20 (i.e., the amount of the final gas MA as a mixture of the diluter gas DA flowing from the upstream side and the mixed gas Hd).

In the first embodiment, on the premise that pressure loss has been adjusted as above, the mixed gas Hd in the purge receiving chamber 10 is made to flow through the second vent 31B into the air passage chamber 20 and to be mixed with the diluter gas DA flowing from the upstream side of the air passage chamber 20. Thus, the ratio of the hydrogen in the final gas MA is suppressed to be within the appropriate range. The appropriate range of 4% or lower is based on a common technical knowledge that gas containing hydrogen is likely to catch fire when the hydrogen ratio exceeds 4%, which is the lower flammability limit for hydrogen.

The above pressure loss adjustment is achieved through, for example, an experiment or simulation conducted as follows. First, pressure loss is calculated by Expression (1) below:

$$\Delta P = K \times Q^2 \tag{1}$$

where $\Delta P$ denotes pressure loss, K denotes the coefficient of pressure loss that is specific to a passage of interest, and Q denotes the flow rate of the gas flowing through the passage of interest.

When the gases in the exhaust hydrogen dilution device 100 come to flow steadily, the pressure loss for the first gas ($\Delta P_1 = K_1 \times Q_1^2$) and the pressure loss for the second gas ($\Delta P_2 = K_2 \times Q_2^2$) become equal as in Expression (2) below:

$$K_1 \times Q_1^2 = K_2 \times Q_2^2 \tag{2}$$

where $Q_1$ denotes the flow rate of the first gas that flows through the air passage chamber 20 from the dilution nozzle DN directly toward the downstream side, and $Q_2$ denotes the flow rate of the second gas that flows from the air passage chamber 20 into the purge receiving chamber 10 through the first vent 31A.

Expression (2) is transformable into Expression (3) given below. Therefore, the ratio of the above flow rates is controllable on the basis of the respective coefficients of pressure loss. In other words, the ratio of the above flow rates is controllable by adjusting the shapes of the passages through which the respective gases flow.

$$Q_1 : Q_2 = \sqrt{K_2} : = \sqrt{K_1} \tag{3}$$

Considering the above, in the first embodiment, the pressure losses at the first vent 31A and the second vent 31B are adjusted as follows, for example.

The pressure loss at the first vent 31A is set higher than or equal to the pressure loss at the second vent 31B. To establish such a relationship, different diameters of the through-holes may be set between the first vent 31A and the second vent 31B, or different numbers of through-holes may be provided between the first vent 31A and the second vent 31B.

In some embodiments, the pressure loss at the first vent 31A may be set such that the purged hydrogen Hp discharged into the purge receiving chamber 10 does not flow reversely into the air passage chamber 20 through the first vent 31A. Such a situation is established by a pressure loss at the first vent 31A that is greater than at least the pressure loss at the second vent 31B. Thus, when the purged hydrogen Hp flows into the purge receiving chamber 10, gas that is pushed by the purged hydrogen Hp in the purge receiving chamber 10 escapes into the second vent 31B. That is, gas in a downstream region, on the side far from the purge nozzle PN, of the purge receiving chamber 10 flows into the air passage chamber 20. Hence, the function of hydrogen dilution is kept normal. On the other hand, the pressure loss at the second vent 31B may be set such that any turbulence generated in the air passage chamber 20 does not flow into the purge receiving chamber 10. Such a situation is established by, for example, adjusting the opening ratio, which is determined by factors such as the diameter and number of through-holes included in each of the vents 31A and 31B. Alternatively, any other known adjustment technique may be employed.

As illustrated in FIG. 3, a pressure loss adjuster 21 may be provided in the air passage chamber 20 so as to adjust the flow rate of the first gas that flows through the air passage chamber 20 from the dilution nozzle DN directly toward the downstream side. The pressure loss adjuster 21, which may be omitted, has a known structure such as a known reducing shape.

To summarize, pressure loss adjustment at the first vent 31A and the second vent 31B is achieved by adjusting the opening ratio determined by factors such as the diameter and number of through-holes included in each of the vents 31A and 31B, or by adjusting the shape (height or outline) of the pressure loss adjuster 21.

The above methods of pressure loss adjustment are only exemplary. The method of adjusting the flow rates at the first vent 31A and the second vent 31B is not limited to the above. The flow rates are also adjustable on the basis of factors such as the specifications of the fuel cell FC or the forms of the vents 31A and 31B, or by any other known method.

In the above exhaust hydrogen dilution device 100 according to the first embodiment, as illustrated in FIGS. 4, 5B, and others, the flow of the diluter gas DA in the air passage chamber 20 diverges into two flows, one of which serves as the first gas that flows toward the downstream side and the other serves as the second gas that flows through the first vent 31A into the purge receiving chamber 10. Meanwhile, the purged hydrogen Hp discharged into the purge receiving chamber 10 is guided by and mixed with the second gas into the mixed gas Hd, and the mixed gas Hd flows through the second vent 31B into the air passage chamber 20. Thus, the two separate flows (the flow of the first gas and the flow of the second gas) generated in the air passage chamber 20 eventually merge together in the downstream region of the air passage chamber 20.

In the first embodiment, the pressure loss is adjusted such that the ratio of the flow rate of the mixed gas Hd that flows through the second vent 31B into the air passage chamber 20 with respect to the flow rate of the first gas becomes, for example, 4/96 or smaller. Thus, in the first embodiment, the ratio of hydrogen in the final gas MA as a mixture of the mixed gas Hd and the first gas falls into the appropriate range (4% or lower in the first embodiment) before the final gas MA is exhausted to the outside through the exhaust nozzle MN.

Figures 6A, 6B:
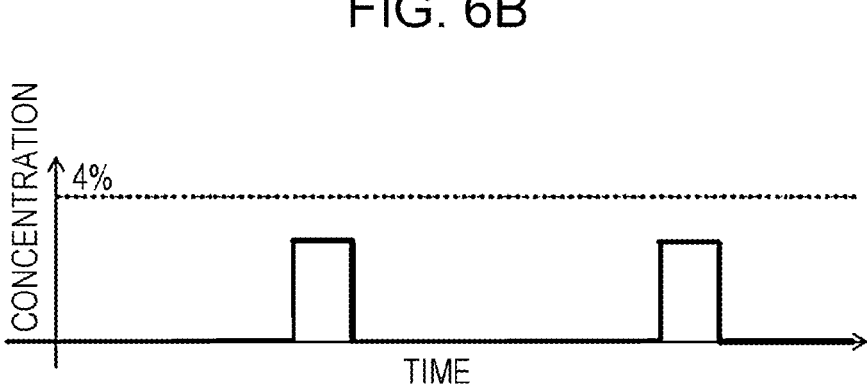
FIG. 6A illustrates changes over time in the ratio (concentration) of hydrogen in exhaust gas generated by a related-art exhaust hydrogen dilution device.
FIG. 6B illustrates changes over time in the ratio (concentration) of hydrogen in exhaust gas generated by the exhaust hydrogen dilution device according to the embodiment.

In the related arts, if the supply of diluter gas DA is insufficient because, for example, the power generated by the fuel cell FC is low, gas with a hydrogen concentration exceeding the appropriate range may be temporarily exhausted to the outside of the system as illustrated in FIG. 6A.

In contrast, the fuel cell system 200 including the exhaust hydrogen dilution device 100 according to the first embodiment dilutes the hydrogen purged from the fuel cell FC into the final gas MA containing hydrogen of an appropriate amount (a concentration of 4% or lower in the first embodiment, as described above) before exhausting the final gas MA to the outside of the vehicle V, regardless of the operating conditions of the vehicle V.

In some embodiments, as illustrated in FIGS. 3 to 5B, the distal end (the center PNc, for example) of the purge nozzle PN in the purge receiving chamber 10 is positioned higher than the first vent 31A in the vertical direction (the direction of gravity). Therefore, for example, even if the amount of diluter gas DA supplied into the air passage chamber 20 is insufficient, the probability that a large amount of purged hydrogen Hp may flow into the air passage chamber 20 is low. Hence, the hydrogen ratio is maintained to be within the appropriate range.

The capacities of the purge receiving chamber 10 and the air passage chamber 20 may be determined in accordance with the grade of the fuel cell vehicle V or the specifications of the fuel cell FC. In some embodiments, the capacity of the purge receiving chamber 10 may be greater than at least the volume of hydrogen to be purged at a time. Therefore, even if hydrogen is purged successively, a satisfactory amount of diluter gas DA flows through the air passage chamber 20. Accordingly, the probability that an excessive amount of hydrogen may flow into the air passage chamber 20 is low. Hence, the above hydrogen ratio is maintained to be within the appropriate range.

B. Second Embodiment: Exhaust Hydrogen Dilution Device 101

A second embodiment of the disclosure will now be described with reference to FIG. 7. An exhaust hydrogen dilution device 101 according to the second embodiment is different from the exhaust hydrogen dilution device 100 according to the first embodiment in further including a turbulence generating member 22.

The following description focuses on the difference from the first embodiment. Elements that are the same as those of the first embodiment are denoted by corresponding ones of the reference signs used in the first embodiment, and description of such elements is omitted accordingly (the same applies to the other embodiments to be described below).

The turbulence generating member 22 is capable of generating turbulence in a region of the air passage chamber 20 that is on the downstream side with respect to the first vent 31A. In other words, the exhaust hydrogen dilution device 101 according to the second embodiment may include a turbulence generating member 22 capable of generating turbulence (such as vortices) near or on the upstream side with respect to the second vent 31B provided in the interface member 30. The turbulence generating member 22 is provided in the air passage chamber 20 and has any of various known structures, such as a spiral fin, capable of generating turbulent air currents.

Figure 7:
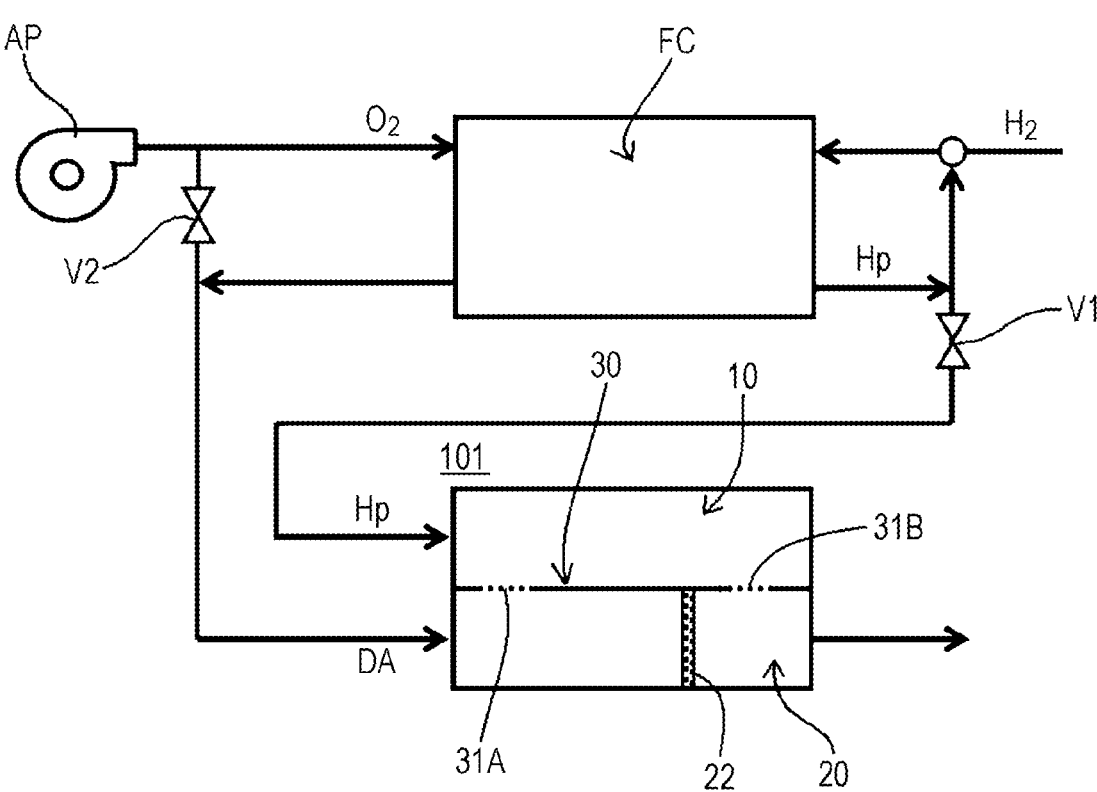
FIG. 7 schematically illustrates a fuel cell system including an exhaust hydrogen dilution device according to an embodiment.

As illustrated in FIG. 7, the turbulence generating member 22 according to the second embodiment may be provided on the downstream side with respect to the first vent 31A and on the upstream side with respect to the second vent 31B in the air passage chamber 20.

In the above exhaust hydrogen dilution device 101 according to the second embodiment, the diluter gas DA (the first gas) that flows through the air passage chamber 20 from the dilution nozzle DN toward the downstream side passes through the turbulence generating member 22, whereby turbulence is generated. Therefore, the mixed gas Hd flowing through the second vent 31B into the air passage chamber 20 is efficiently mixed with the diluter gas DA (the first gas).

Thus, in the second embodiment, the effects of the first embodiment are produced, and the probability that the hydrogen concentration may become uneven when the mixed gas Hd is diluted with the diluter gas DA (the first gas) is reduced.

C. Third Embodiment: Exhaust Hydrogen Dilution Device 102

Figure 8A:
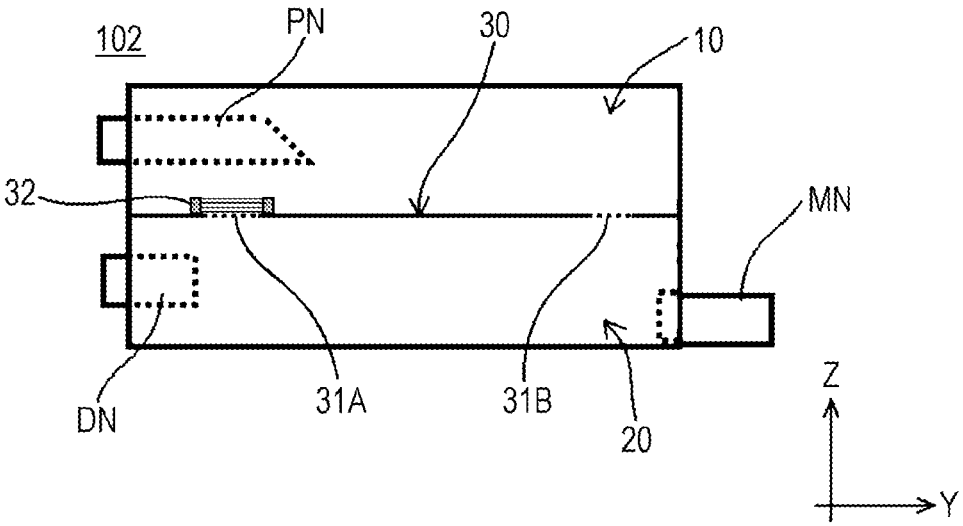
FIG. 8A schematically illustrates an exhaust hydrogen dilution device according to an embodiment.

A third embodiment of the disclosure will now be described with reference to FIG. 8A. An exhaust hydrogen dilution device 102 according to the third embodiment is different from the exhaust hydrogen dilution device 100 according to the first embodiment in further including a water blocking member 32. While FIG. 8A does not illustrate elements other than the exhaust hydrogen dilution device 102, the exhaust hydrogen dilution device 102 is included in the fuel cell system 200 as described in the first embodiment.

In the exhaust hydrogen dilution device 102 according to the third embodiment, the water blocking member 32, which has a cylindrical shape, is provided in the purge receiving chamber 10 (on the interface member 30) in such a manner as to surround the first vent 31A provided in the interface member 30. The water blocking member 32 surrounds the first vent 31A so that the first vent 31A is not closed (occluded) by liquid (such as water including waterdrops) that may be generated in the purge receiving chamber 10.

The material for the water blocking member 32 is not limited as long as the above function is obtained and may be, for example, a metal material such as steel or aluminum having rustproof treatment done, or a resin material such as plastic.

The water blocking member 32 according to the third embodiment having a cylindrical shape surrounding the first vent 31A may have a constant height or may be shaped such that, for example, a downstream part (the side nearer to the second vent 31B) is lower than the other part. In FIG. 8A, the water blocking member 32 according to the third embodiment surrounding the first vent 31A extends upright in the vertical direction. Alternatively, the water blocking member 32 may extend obliquely, tilted toward the downstream side.

The tilted shape assists the diluter gas DA (the second gas) flowing through the first vent 31A into the purge receiving chamber 10 to efficiently flow toward the downstream side. In such a case, the water blocking member 32 serves as a rectification guide.

Thus, in the third embodiment, the effects of the first embodiment are produced, and the probability that the first vent 31A may be closed by water or the like generated in the purge receiving chamber 10 is reduced.

D. Fourth Embodiment: Exhaust Hydrogen Dilution Device 103

A fourth embodiment of the disclosure will now be described with reference to FIG. 8B. An exhaust hydrogen dilution device 103 according to the fourth embodiment is different from the exhaust hydrogen dilution device 100 according to the first embodiment in further including a water guiding structure 33.

Figure 8B:
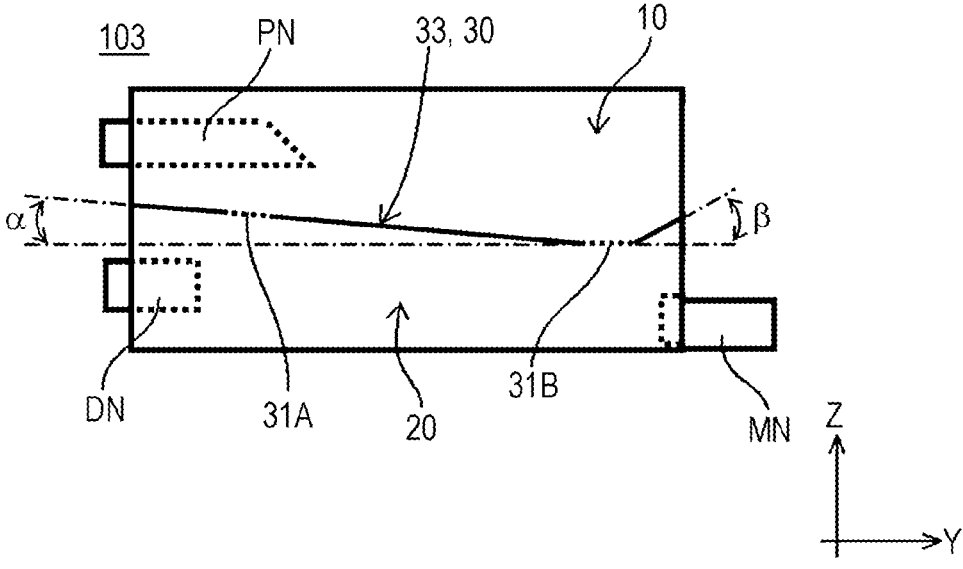
FIG. 8B schematically illustrates an exhaust hydrogen dilution device according to an embodiment.

As illustrated in FIG. 8B, the exhaust hydrogen dilution device 103 according to the fourth embodiment includes the water guiding structure 33, which guides liquid (such as water including waterdrops) that may be generated in the purge receiving chamber 10 to flow toward the second vent 31B.

The water guiding structure 33 according to the fourth embodiment is obtained by inclining the bottom of the purge receiving chamber 10 (i.e., the interface member 30 in the fourth embodiment) such that the second vent 31B resides at a relatively low position in the vertical direction.

The water guiding structure 33 according to the fourth embodiment that is formed of the interface member 30 inclines constantly up to the second vent 31B. Alternatively, for example, the water guiding structure 33 may be inclined in a graded manner, with the second vent 31B residing at the lowest position in the purge receiving chamber 10.

Thus, in the fourth embodiment, the effects of the first embodiment are produced, and the probability that the first vent 31A may be closed by water or the like generated in the purge receiving chamber 10 is reduced.

In some embodiments, as illustrated in FIG. 8B, an angle β formed in the purge receiving chamber 10 by a portion of the interface member 30 that is on the downstream side with respect to the second vent 31B may be greater than an angle α formed by a portion of the interface member 30 that is on the upstream side with respect to the second vent 31B. In such an embodiment, the purged hydrogen Hp discharged from the purge nozzle PN into the purge receiving chamber 10 more efficiently flows into the second vent 31B.

Note that all the embodiments described above are only exemplary for describing the disclosure, and elements described in the embodiments may be combined in any way to obtain other structures and control methods, without departing from the essence of the disclosure.

While some embodiments of the disclosure have been described with reference to the accompanying drawings, it is obvious that those who have common knowledge in the fields relevant to the disclosure can make further modifications to the above embodiments. It is naturally understood that such modifications are also within the technical scope of the disclosure.

The invention claimed is:

1. An exhaust hydrogen dilution device to be mounted on a fuel cell system, the exhaust hydrogen dilution device comprising:
   a purge receiving chamber configured to temporarily store hydrogen that is to be purged intermittently from a fuel cell of the fuel cell system;
   an air passage chamber through which diluter gas is to flow, the air passage chamber adjoining the purge receiving chamber; and a purge nozzle coupled to the purge receiving chamber, and comprising a distal end configured to discharge the hydrogen into the purge receiving chamber, wherein
   an interface region between the purge receiving chamber and the air passage chamber comprises an interface member having a first vent on an upstream side and a second vent on a downstream side,
   a pressure loss at the first vent is greater than or equal to a pressure loss at the second vent,
   some of the diluter gas flows from the air passage chamber into the purge receiving chamber through the first vent and is mixed with the hydrogen stored in the purge receiving chamber into a mixed gas that flows toward the second vent,
   the pressure loss at the first vent and the pressure loss at the second vent are adjusted such that a ratio of the hydrogen flowing into the air passage chamber through the second vent is 4% or lower with respect to a total amount of gases that flow through the air passage chamber,
   the mixed gas in the purge receiving chamber flows into the air passage chamber through the second vent and is diluted with the diluter gas,
   the interface member inclines up to the second vent with the second vent residing at a lowest position in the purge receiving chamber,
   the interface member includes a first portion between the first vent and the second vent, and a second portion between the second vent and a side wall of the purge receiving chamber at the downstream side, the distal end of the purge nozzle is at a space within the purge receiving chamber above the first portion, and
   the interface member is configured to rectify a flow of the hydrogen from the purge nozzle toward the second vent by a structure including:
   (i) the purge receiving chamber providing for an unobstructed flow path between the purge nozzle and the second vent; and
   (ii) the first portion inclining at a first angle with respect to the second vent, and the second portion inclines at a second angle greater than the first angle with respect to the second vent.

2. The exhaust hydrogen dilution device according to claim 1, further comprising:
   a water guiding structure configured to guide liquid to be generated in the purge receiving chamber to flow toward the second vent.

3. The exhaust hydrogen dilution device according to claim 1, further comprising a supplemental gas supply device supplying supplemental gas into the air passage chamber,
   wherein the supplemental gas supply device provides gas comprising oxygen to the air passage chamber when a flow rate of air discharged from the fuel cell is below a certain level as the diluter gas.

4. The exhaust hydrogen dilution device according to claim 1, further comprising
   a water blocking member that has a cylindrical shape being provided in the purge receiving chamber on the interface member in such a manner as to surround the first vent provided in the interface member, wherein the blocking member is configured to block liquid to be generated in the purge receiving chamber from closing the first vent.

5. The exhaust hydrogen dilution device according to claim 1, further comprising a water blocking member that has a cylindrical shape being provided in the purge receiving chamber on the interface member in such a manner as to surround the first vent provided in the interface member, wherein
   the blocking member is configured to block liquid to be generated in the purge receiving chamber from closing the first vent, and comprises an upstream part and a downstream part nearer to the second vent than the upstream part, and
   the downstream part is lower than the upstream part.

6. The exhaust hydrogen dilution device according to claim 1, further comprising:
   a water blocking member surrounding the first vent and being configured to block liquid to be generated in the purge receiving chamber from closing the first vent.

7. The exhaust hydrogen dilution device according to claim 6, further comprising:
   a water guiding structure configured to guide the liquid to flow toward the second vent.

8. The exhaust hydrogen dilution device according to claim 1, further comprising:
   a turbulence generating member capable of generating turbulence in a region of the air passage chamber, the region residing on the downstream side with respect to the first vent.

9. The exhaust hydrogen dilution device according to claim 8, further comprising:
   a water guiding structure configured to guide liquid to be generated in the purge receiving chamber to flow toward the second vent.

10. The exhaust hydrogen dilution device according to claim 8, further comprising:

a water blocking member surrounding the first vent and being configured to block liquid to be generated in the purge receiving chamber from closing the first vent.

11. The exhaust hydrogen dilution device according to claim 10, further comprising:

a water guiding structure configured to guide the liquid to flow toward the second vent.

* * * * *